(12) United States Patent
Taniguchi et al.

(10) Patent No.: US 10,742,151 B2
(45) Date of Patent: Aug. 11, 2020

(54) INVERTER CONTROL DEVICE AND MOTOR DRIVE SYSTEM

(71) Applicants: Toshiba Infrastructure Systems & Solutions Corporation, Kanagawa (JP); Toshiba Industrial Products and Systems Corporation, Kanagawa (JP)

(72) Inventors: Shun Taniguchi, Tokyo (JP); Kazuya Yasui, Tokyo (JP); Tomoaki Shigeta, Tokyo (JP)

(73) Assignees: Toshiba Infrastructure Systems & Solutions Corporation, Kanagawa (JP); Toshiba Industrial Products and Systems Corporation, Kanagawa (JP)

( * ) Notice: Subject to any disclaimer, the term of this patent is extended or adjusted under 35 U.S.C. 154(b) by 0 days.

(21) Appl. No.: 16/292,593

(22) Filed: Mar. 5, 2019

(65) Prior Publication Data

US 2019/0199260 A1    Jun. 27, 2019

Related U.S. Application Data

(63) Continuation of application No. PCT/JP2017/031002, filed on Aug. 29, 2017.

(30) Foreign Application Priority Data

Sep. 5, 2016  (JP) .................. 2016-173014

(51) Int. Cl.
*H02P 21/22* (2016.01)
*H02P 21/00* (2016.01)
(Continued)

(52) U.S. Cl.
CPC .............. *H02P 21/22* (2016.02); *H02P 21/00* (2013.01); *H02P 21/05* (2013.01); *H02P 25/022* (2013.01); *H02P 25/092* (2016.02); *H02P 27/08* (2013.01)

(58) Field of Classification Search
CPC ....................................................... H02P 21/00
See application file for complete search history.

(56) References Cited

U.S. PATENT DOCUMENTS 8,975,841 B2     3/2015   Maekawa
2002/0180398 A1  12/2002  Nakatsugawa et al.
(Continued)

FOREIGN PATENT DOCUMENTS

EP    3252941 A1    12/2017
JP    H07-308088 A  11/1995
(Continued)

OTHER PUBLICATIONS

International Search Report and Written Opinion issued in PCT/JP2017/031002, dated Nov. 21, 2017 (17 pages).

(Continued)

*Primary Examiner* — Bentsu Ro
(74) *Attorney, Agent, or Firm* — Baker Botts L.L.P.

(57) ABSTRACT

A device according to an embodiment includes an circuit; a detector for detecting a current response output from the circuit; a vector converter for converting the current response into a d-axis current and a q-axis current by using a rotational phase angle of a motor connected to the circuit; a calculator for calculating, based on a torque command and a current phase angle command, a current amplitude command of the current response output from the circuit; a dq-axes converter for calculating a d-axis current command and a q-axis current command from the current amplitude command and the current phase angle command; and a controller for calculating a voltage command so that the d-axis current command and the q-axis current command are equal to the d-axis current and the q-axis current.

18 Claims, 5 Drawing Sheets

(51) Int. Cl.
*H02P 27/08* (2006.01)
*H02P 25/092* (2016.01)
*H02P 21/05* (2006.01)
*H02P 25/022* (2016.01)

(56) References Cited

U.S. PATENT DOCUMENTS

| | | | |
|---|---|---|---|
| 2005/0140329 A1* | 6/2005 | Ihm | H02P 21/06 |
| | | | 318/712 |
| 2009/0256518 A1* | 10/2009 | Kitanaka | H02P 21/26 |
| | | | 318/802 |
| 2010/0127648 A1 | 5/2010 | Akiyama | |
| 2011/0175558 A1* | 7/2011 | Kitanaka | H02P 21/05 |
| | | | 318/400.3 |
| 2017/0317623 A1 | 12/2017 | Taniguchi et al. | |
| 2019/0199253 A1* | 6/2019 | Shigeta | H02P 6/183 |

FOREIGN PATENT DOCUMENTS

| | | |
|---|---|---|
| JP | H07-308089 A | 11/1995 |
| JP | 2002360000 A | 12/2002 |
| JP | 3818086 B2 | 9/2006 |
| JP | 2010081743 A | 4/2010 |
| JP | 2012-249459 A | 12/2012 |
| JP | 5185043 B2 | 4/2013 |
| JP | 2013223333 A | 10/2013 |
| JP | 2014-176135 A | 9/2014 |
| JP | 2015-119565 A | 6/2015 |
| WO | 2016/121751 A1 | 8/2016 |
| WO | 2016121237 A1 | 8/2016 |

OTHER PUBLICATIONS

Extended European Search Report issued in related European Patent Application No. 17846507.6 dated Mar. 19, 2020, 8 pages.

* cited by examiner

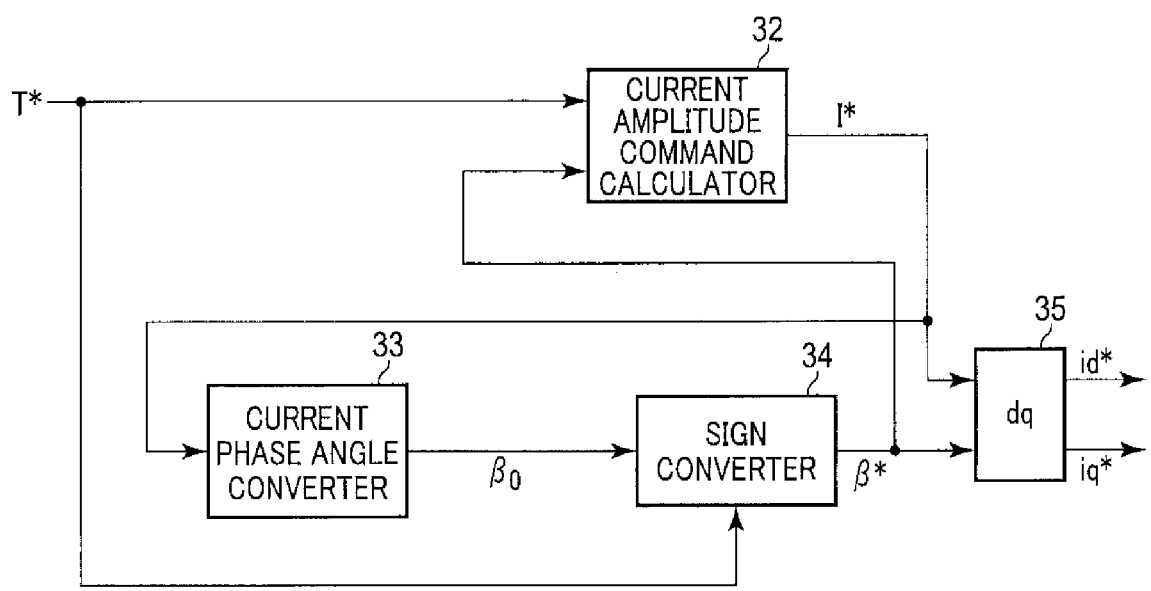
F I G. 2

US 10,742,151 B2

INVERTER CONTROL DEVICE AND MOTOR DRIVE SYSTEM

CROSS REFERENCE TO RELATED APPLICATIONS

This application is a Continuation Application of PCT Application No. PCT/JP2017/031002, filed Aug. 29, 2017 and based upon and claiming the benefit of priority from Japanese Patent Application No. 2016-173014, filed Sep. 5, 2016, the entire contents of all of which are incorporated herein by reference.

FIELD

Embodiments described herein relate generally to an inverter control device and a motor drive system.

BACKGROUND

Proposed as synchronous motors with a low magnetic flux have been, for example, inverter control devices for controlling inverters for driving a Synchronous Reluctance Motor (SynRM). A synchronous reluctance motor is a synchronous motor that does not use a permanent magnet, and in which the difference between an inductance in the d-axis direction (direction in which the magnetic flux flows easily) and an inductance in the q-axis direction (direction in which the magnetic flux flows hardly) generates a reluctance torque that causes the rotor to rotate.

Proposed for inverter control devices controlling a synchronous reluctance motor have been, amongst others, a method of calculating a current phase angle from a current amplitude command, and a method of calculating a current amplitude command and a current phase angle from a torque command using a linear or a quadratic function.

Also proposed have been speed controls to generate a torque command by multiplying a dq-axes current command by a coefficient in accordance with a speed command.

However, in the above-mentioned inverters configured to drive a synchronous motor having a low magnetic flux, using a method that adopts an arithmetic expression or a map makes it difficult to accurately calculate a current amplitude command in accordance with the torque command, whereby the torque output from the motor may, in some cases, not be in accordance with the torque command.

BRIEF DESCRIPTION OF THE DRAWINGS

FIG. 2 is a block diagram schematically showing a configuration example of a current command generator of the inverter control device and the motor drive system shown in FIG. 1.

DETAILED DESCRIPTION

An inverter control device according to an embodiment comprises an inverter main circuit; a current detector for detecting a current response output from the inverter main circuit; a vector converter for converting the current response into a d-axis current and a q-axis current by using a rotational phase angle of a motor connected to the inverter main circuit; a current amplitude command calculator for calculating, based on a torque command and a current phase angle command, a current amplitude command of the current response output from the inverter main circuit; a dq-axes converter for calculating a d-axis current command and a q-axis current command from the current amplitude command and the current phase angle command; and a current controller for calculating a voltage command so that the d-axis current command and the q-axis current command are equal to the d-axis current and the q-axis current.

Hereinafter, the inverter control device and the motor drive system of the first embodiment will be described with reference to the drawings.

Figure 1:
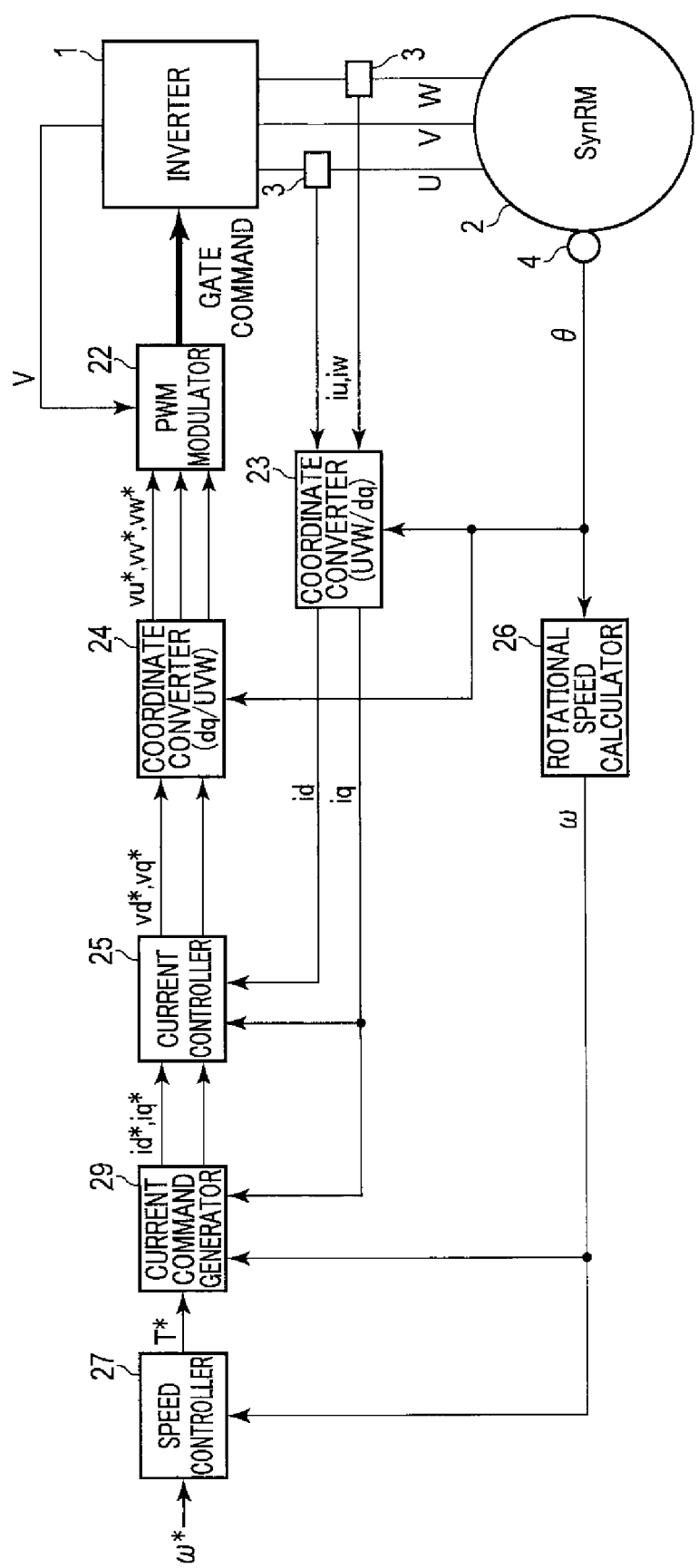
FIG. 1 is a block diagram schematically showing a configuration example of an inverter control device and a motor drive system of a first embodiment.

FIG. 1 is the block diagram schematically showing the configuration example of the inverter control device and the motor drive system of the first embodiment.

The motor drive system of the embodiment comprises a motor 2 and the inverter control device. The inverter control device comprises an inverter 1, a current detector 3, a rotational phase angle detector 4, a PWM modulator 22, coordinate converters 23 and 24, a current controller 25, a rotational speed calculator 26, a speed controller 27, and a current command generator 29.

The inverter 1 comprises an inverter main circuit (not shown) and a direct current power supply. The inverter 1 is a three-phase alternating inverter that is capable of reciprocal alternating current/direct current-conversion by being caused, by a gate command output from the inverter control device and input to the inverter 1, to switch a plurality of switching elements built into the inverter main circuit. The alternating current output from the inverter 1 is supplied to the motor 2.

The inverter 1 further comprises a voltage detector (not shown) configured to detect a voltage V of a direct current link connecting the inverter main circuit to the direct current power supply. The value of the voltage V detected by the voltage detector is supplied to the PWM modulator 22.

The motor 2 is a synchronous motor that has a small magnetic flux and that is driven by an alternating current supplied from the inverter 1, such as, for example, a Synchronous Reluctance Motor (SynRM). The motor 2 is configured to generate a torque caused by magnetic interactions with the rotor due to a magnetic field that is generated by a three-phase alternating current flowing through each of a number of excitation phases.

The current detector 3 detects the current values of at least two of the three-phase alternating currents iu, iv, iw flowing between the inverter 1 and the motor 2.

The rotational phase angle detector 4 is, for example, a resolver and configured to detect a rotational phase angle θ of the motor 2. Note that any configuration for the rotational phase angle detector 4 is viable in which the estimated rotational phase angle value is calculated, for example, without the use of any sensor, from a detected current value detected by the current detector 3 or a detected voltage value obtained by detecting the voltage output from the inverter 1. In this case, the estimated rotational phase angle value may be output as the rotational phase angle θ.

The coordinate converter 23 is a vector converter configured to convert current responses iu, iw of a three-phase fixed reference frame into current responses id, iq of a dq-rotating reference frame by using the rotational phase angle θ supplied from the rotational phase angle detector 4. Note that the d-axis is the direction in which the magnetic resistance of the rotor is the maximum (inductance is the minimum), and that the q-axis is the direction in which the magnetoresistance of the rotor advanced by 90 degrees in electrical angle from the d-axis is the minimum (inductance is the maximum).

The rotational speed calculator 26 is configured to receive the rotational phase angle θ from the rotational phase angle detector 4, calculate the rotational speed ω by, for example, performing temporal differentiation to the rotational phase angle θ, and then output the result.

The speed controller 27 is, for example, a PI controller, configured to calculate a torque command T* so that a rotational speed command ω* supplied from the outside and a rotational speed ω supplied from the rotational speed calculator 26 are equal, and then output the result.

The current command generator 29 is configured to calculate a d-axis current command id* and a q-axis current command iq*, based on the rotational speed ω supplied from the rotational speed calculator 26, the q-axis current iq supplied from the coordinate converter 23, and the torque command T* supplied from the speed controller 27, and then output the result. The configuration of the current command generator 29 will be described in greater detail further below.

The current controller 25 is, for example, a PI controller, configured to compare the current responses id, iq against the current commands id*, iq*, calculate d-axis voltage command vd* and q-axis voltage command vq* so that the current responses id, iq and the current commands id*, iq* are the same, and then outputs the result.

The coordinate converter 24 is a vector converter configured to convert, by using the rotational phase angle, the voltage commands vd*, vq* of a dq-rotational reference frame into voltage commands vu*, vv*, vw* of a three-phase fixed reference frame.

The PWM modulator 22 is configured to modulate, using triangular PWM according to the voltage V supplied from the inverter 1, the voltage commands (modulation rate commands) vu*, vv*, vw* for driving the motor 2, and output, to the inverter 1, a gate signal for switching the switching elements of each phase inside the main circuit of the inverter 1.

FIG. 2 is the block diagram schematically showing the configuration example of the current command generator of the inverter control device and the motor drive system shown in FIG. 1.

The current command generator 29 comprises a current amplitude command calculator 32, a current phase angle calculator (first current phase angle command calculator) 33, a sign converter 34, and a dq-axes converter 35.

The current amplitude command calculator 32 is configured to calculate a current amplitude command I* from inductances Ld and Lq, a torque command T2* after torque limitation, and a current phase angle command β*. The inductances Ld, Lq are, for example, constants recorded in a memory (not shown). Note with respect to the q-axis inductance Lq that the current amplitude command calculator 32 may calculate a value of the q-axis inductance Lq using a table storing a value of the q-axis inductance Lq that corresponds to the q-axis current iq. Where the motor 2 is the synchronous reluctance motor, the current amplitude command I* is obtainable from the current phase angle β* and the torque command T* by using the following Formula (1).

The torque command T* is obtainable from the following equation.

$$T^* = p(L_d - L_q) i_d i_q \qquad \text{[Mathematical 1]}$$

By modifying the equation using the current phase angle β*, the following equation is obtained.

$$T^* = p(L_d - L_q) I^* \cos\beta^* I^* \sin\beta^* \qquad \text{[Mathematical 2]}$$

This equation can be further modified as follows.

$$T^* = p(L_d - L_q) I^{*2} \tfrac{1}{2} \sin 2\beta^* \qquad \text{[Mathematical 3]}$$

By solving the equation for the current amplitude command I*, following Formula (1) is obtained.

[Mathematical 4]

$$I^* = \sqrt{\frac{2T_2^*}{p(L_d - L_q)\sin 2\beta^*}} \qquad \text{Formula (1)}$$

The current phase angle calculator 33 is configured to calculate, from a current amplitude, a current phase angle β0 at which a copper loss is minimum, and then output the result. The current phase angle calculator 33 may calculate the current phase angle β0 by an approximate formula expressing the relationship between the current amplitude command I* and the current phase angle β0, and include a map storing a value of the current phase angle β0 for the current amplitude command I*. The present case mentions the copper loss minimum, but the minimum loss or the maximum power factor are just as viable.

The sign converter 34 is configured to determine whether the torque command T* is equal to or greater than zero, or negative. If the torque command T* is equal to or greater than zero, the sign converter 34 renders the sign of the current phase angle β0 positive and outputs the result as the current phase angle command β*. If the torque command T* is negative, the sign converter 34 renders the sign of the current phase angle β0 negative and outputs the result as the current phase angle command (first current phase angle command) β*.

Note that in the present embodiment, the current phase angle calculator 33 and the sign converter 34 are current phase angle command calculators configured to calculate, based on the current amplitude command I*, the current phase angle command β* of the current response output from the inverter main circuit.

The dq-axes converter 35 calculates the current commands id*, iq*, from the current amplitude command I* and the current phase angle command β*, in accordance with following Formulae (3), (4). The current commands id*, iq* are supplied to the above-described current controller 25.

[Mathematical 5]

$$i_d^* = I^* \cos\beta^* \qquad \text{Formula (3)}$$

$$i_q^* = I^* \sin\beta^* \qquad \text{Formula (4)}$$

Note that in the above Formula (3), (4), the current amplitude command I* is the present value (N) and the current phase angle β* is the previous value (N−1). However, the present embodiment is not limited thereto, meaning that the current amplitude command calculator 32 is able to calculate one of: the current amplitude command I* and the current phase angle β* as the present value (N), and the other as the previous value (N−1). As an example, the present value (N) of the current phase angle β* may be calculated by using the previous value (N−1) of the current amplitude command I*, and the current commands id*, iq* may be calculated by the above Formulae (3), (4) using the previous value (N−1) of the current amplitude command I* and the present value (N) of the current phase angle β*.

However, the current commands id*, iq* can be calculated more accurately by comparing the amounts of change in the current amplitude command I* and the current phase angle β* during a predetermined period, and subsequently using, for the one with the greater amount of change, the present value (N), and using, for the one with the smaller amount of change, the previous value (N−1).

In the inverter control device and the motor drive system of the present embodiment, by calculating the current amplitude command I* using the above Formulae (1), (3), (4), a current command value can be generated that is in accordance with the torque command.

However, sometimes, an output torque in accordance with the torque command fails to be realized, since the torque changes according to the change in the current phase angle when the current phase angle command changes according to the operating condition, for example, when the current phase angle command is calculated from the current amplitude command. As an example, during speed control, it is difficult to equalize the torque command and the actually output torque, since the control for changing the current phase angle interferes with the speed control.

Since, in the present embodiment, the current amplitude command I* is calculated as described above, the current commands id*, iq* can be uniquely calculated, even if the current phase angle β changes due to the copper loss minimizing control. In other words, if the motor parameters are correctly adjustable, the current amplitude command calculator 32 can output, irrespective of the current phase angle β, a current amplitude I* in accordance with the torque command T2*. Thus, the current command generator 29 can calculate the current commands id*, iq* in accordance with the torque command T2* and realize an output torque in accordance with the command T2* even if the current phase angle β0 becomes the copper loss minimum due to the current phase angle calculator 33.

Moreover, when using the speed control, it is possible to output, at the current amplitude command calculator 32, a torque that is in accordance with the torque command T2* by using the current phase angle command β*. Therefore, it is possible to avoid interferences between the speed control and the control for changing the current phase angle β* to the current phase angle β0 by the current phase angle calculator 33, and thus it is possible to avoid vibrations and divergences in the control system.

In other words, according to the inverter control device and the motor drive system of the present embodiment, the current amplitude command can be generated so that the output torque of the motor is in accordance with the torque command.

Next, the inverter control device and the motor drive system of the second embodiment will be described with reference to the drawings. Note that similar configurations hereinafter carry the same reference symbols as those in the above-described first embodiment, and that a detailed description of the same will be omitted.

Figure 3:
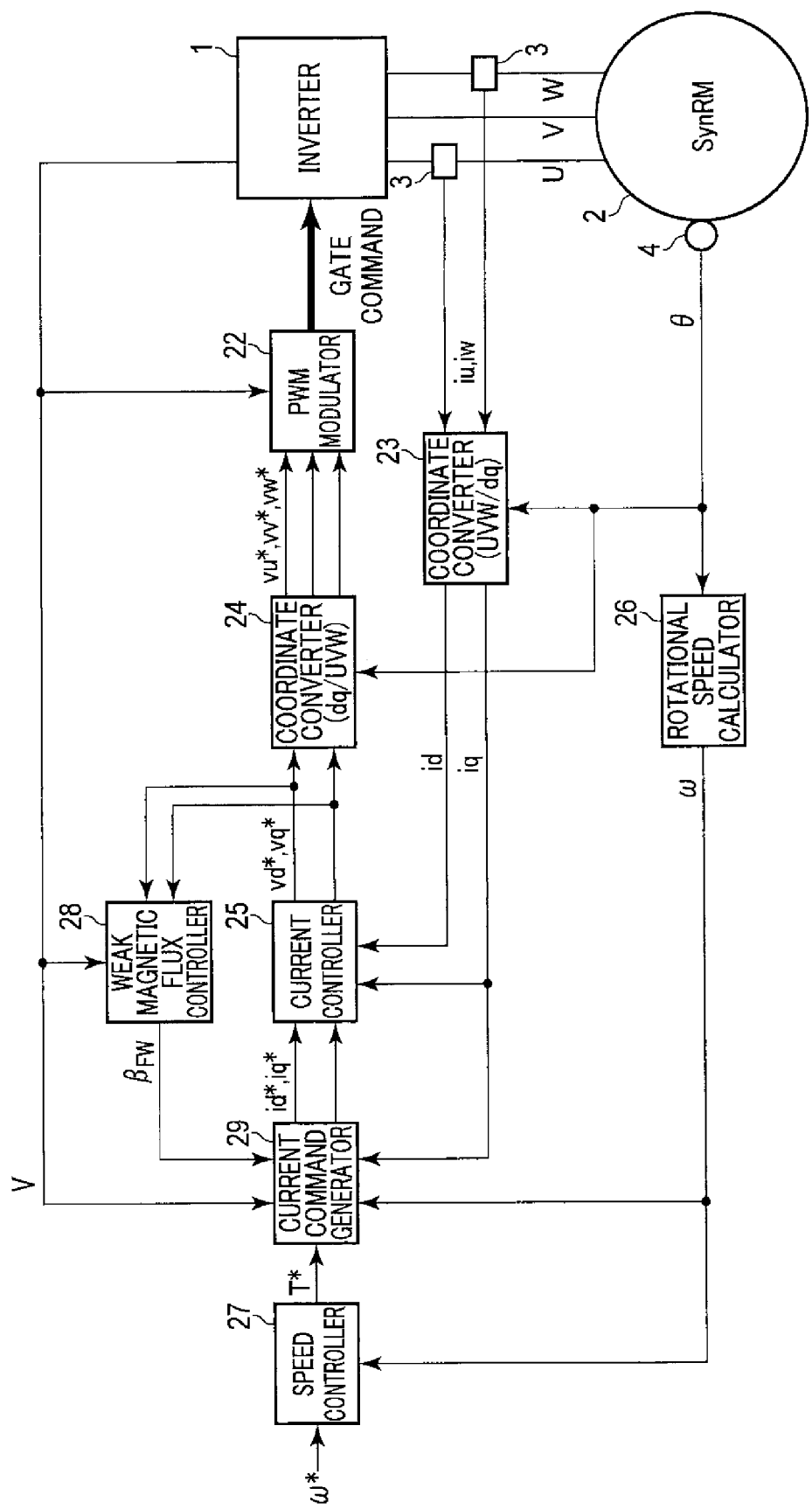
FIG. 3 is a block diagram schematically showing a configuration example of an inverter control device and a motor drive system according to a second embodiment.

FIG. 3 is the block diagram schematically showing the configuration example of the inverter control device and the motor drive system of the second embodiment.

The inverter control device of the present embodiment further comprises a weak magnetic flux controller (second current phase angle command calculator) 28.

The weak magnetic flux controller 28 is configured to calculate a weak magnetic flux current phase angle βFW so that the voltage command does not exceed a maximum output voltage value (=voltage limit value Vlim), and then output the result. The weak magnetic flux controller 28 is further configured to calculate a weak current phase angle command (second current phase angle command) βFW from the voltage commands vd*, vq* output from the current controller 25.

Note that in the present embodiment, the current phase angle calculator 33 is the first current phase angle command calculator for calculating the first current phase angle command β0 based on the current amplitude command I*.

Figure 4:
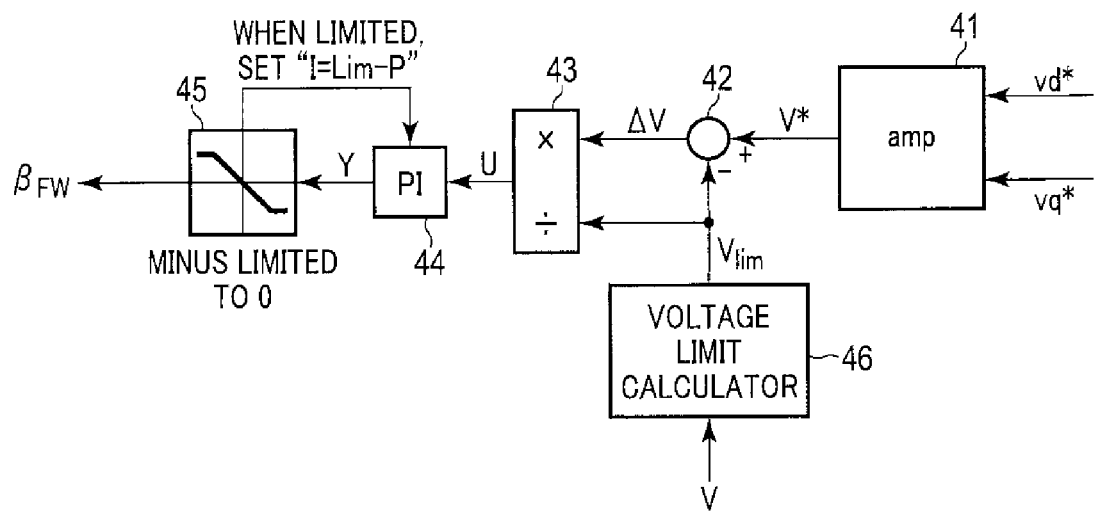
FIG. 4 is a block diagram schematically showing a configuration example of a weak magnetic flux controller shown in FIG. 3.

FIG. 4 is the block diagram schematically showing the configuration example of the weak magnetic flux controller shown in FIG. 3.

The weak magnetic flux controller 28 comprises a voltage amplitude command calculator 41, a subtractor 42, a divider 43, a PI controller 44, and a limit controller 45.

The voltage amplitude command calculator 41 is configured to calculate the voltage commands vd*, vq* and a voltage amplitude command V* using following Formula (5).

[Mathematical 6]

$$V^* = \sqrt{v_d^{*2} + v_q^{*2}} \qquad \text{Formula (5)}$$

The subtractor 42 is configured to calculate a voltage deviation ΔV (=V*−Vlim) by subtracting the voltage limit value Vlim from the voltage amplitude command V* output from the voltage amplitude command calculator 41.

The divider 43 is configured to calculate an input U (=ΔV/Vlim=(V*−Vlim)/Vlim) of the PI controller 44 by dividing the voltage deviation ΔV by the voltage limit value Vlim, and then output the result.

Note that the voltage limit value Vlim is calculated at a voltage limit value calculator 46 by, for example, the following Formula (6) using the direct current voltage V supplied from the inverter 1, and it is used for calculations by the subtractor 42 and the divider 43.

[Mathematical 7]

$$V_{lim} = \frac{V}{\sqrt{2}} a \qquad \text{Formula (6)}$$

Here, V is the direct current link voltage (direct current voltage) V between the inverter main circuit and the direct current power supply, and a is the modulation factor. a is a preset value that is, for example, recorded in a memory (not shown), and it is generally set to approximately 1 to 1.05.

Although, here, the calculation is performed using the inverter direct current voltage V, the preset value may be utilized without using the direct current voltage V.

The PI controller 44 is configured to calculate an output Y according to the proportional P and the integral I so that the input U supplied from the divider 43 is zero, and then output the result.

The limit controller 45 determines whether an input Y supplied from the PI controller 44 is equal to, greater or less than zero. When the input Y is less than zero, the limit controller 45 outputs the weak magnetic flux current phase angle βFW as zero. When the input Y is equal to or greater than zero, the limit controller 45 outputs the weak magnetic flux current phase angle βFW as a value that is equal to the input Y.

When the weak magnetic flux current phase angle βFW is limited to zero, the limit controller 45 sets the integral (I=Lim−P) so that the integral I and the proportional P of the PI controller 44 are equal (anti-windup).

Figure 5:
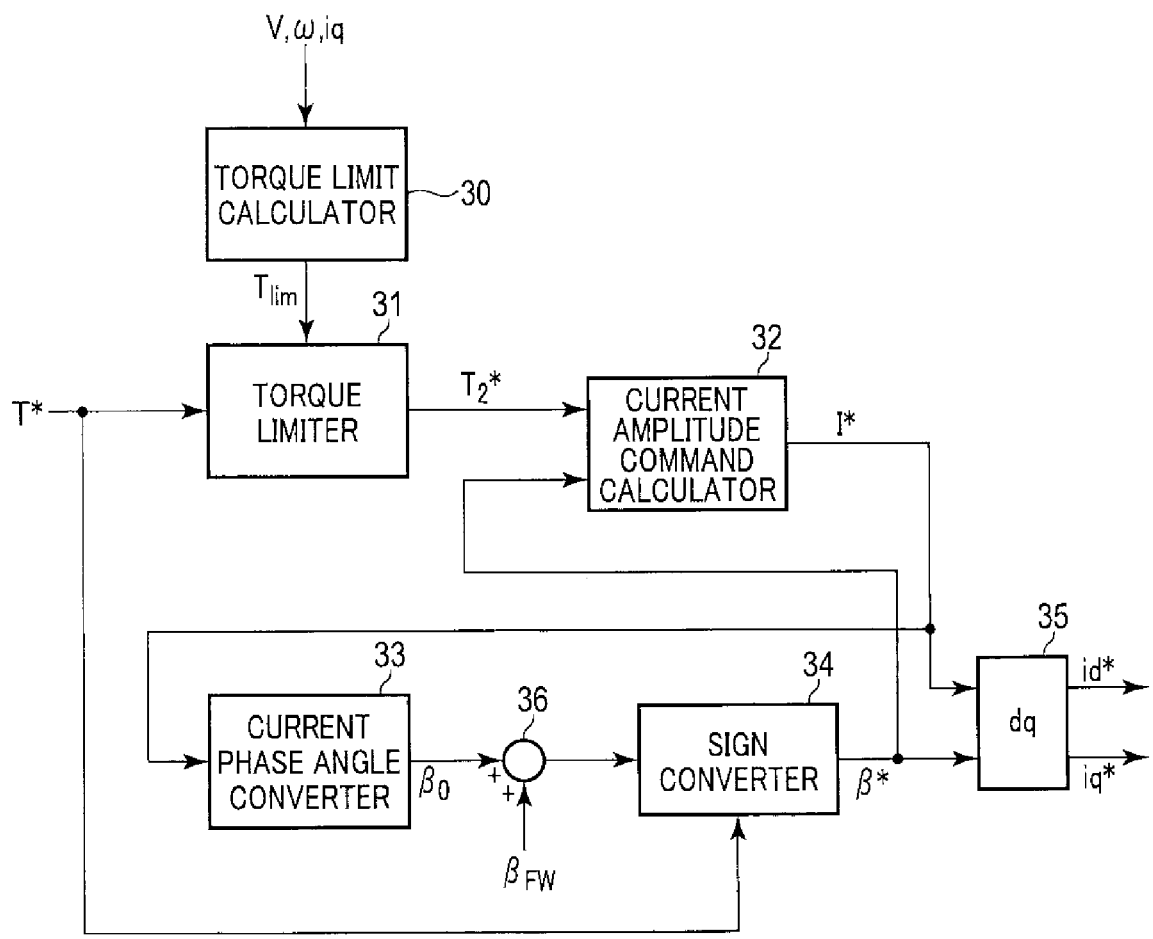
FIG. 5 is a block diagram schematically showing a configuration example of a current command generator shown in FIG. 3.

FIG. 5 is the block diagram schematically showing the configuration example of the current command generator shown in FIG. 3.

The current command generator 29 in the inverter control device according to the present embodiment further comprises a torque limit calculator 30, a torque limiter 31, and an adder 36. The voltage V supplied from the inverter 1 is added as an input. The torque limit calculator 30 is configured to calculate a torque limit (maximum torque command value) Tlim from the rotational speed ω of the motor 2, the direct current link voltage (direct current voltage) V between the inverter main circuit and the direct current power supply, and a q-axis voltage iq, and then output the result.

Figure 6:
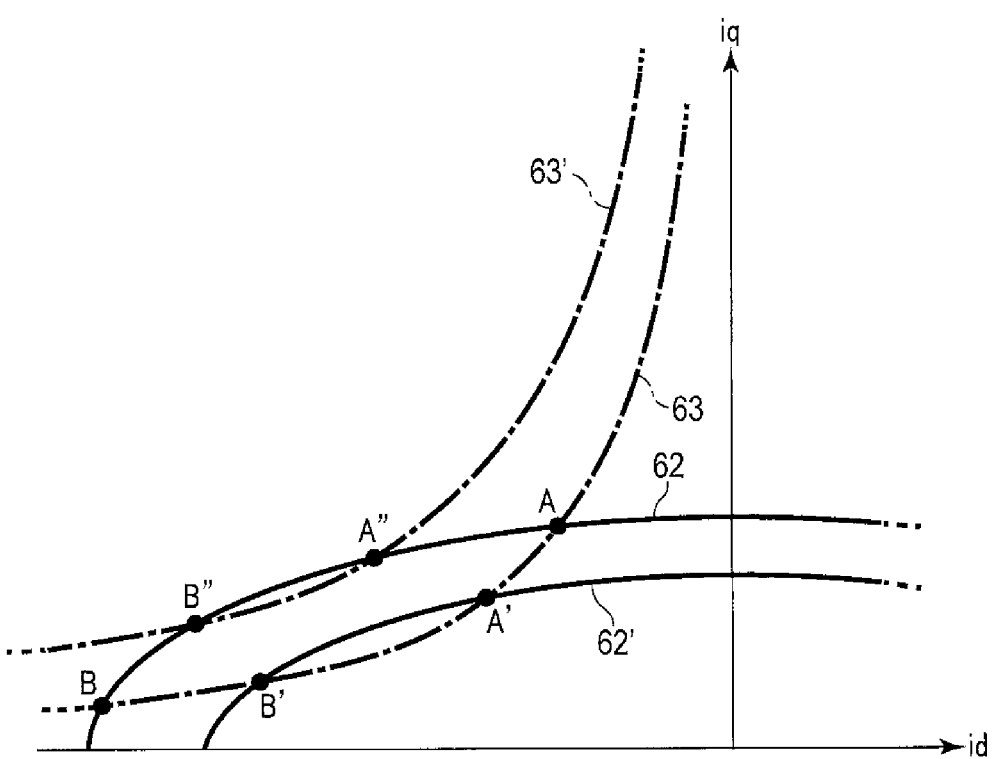
FIG. 6 is a diagram showing an example of a constant voltage curve and a constant torque curve when the output voltage of the motor is limited.

FIG. 6 is the diagram showing the example of the constant voltage curve and the constant torque curve when the output voltage of the motor is limited.

When the output voltage of the motor 2 is limited, the inverter 1 operates at, for example, a point A among intersections A and B of a constant voltage curve 62 and a constant torque curve 63 shown in FIG. 3. From here, when the rotational speed increases, the d-axis current and the q-axis current of the constant voltage curve 62' become smaller than those of the constant voltage curve 62. At this point, the constant voltage curve 62' and the constant torque curve 63 intersect at an intersections A' and B', and the regions surrounded by the constant voltage curve 62' and the constant torque curve 63 become narrow. When the rotational speed further increases, the constant voltage curve 62' and the constant torque curve 63 no longer intersect. In other words, when the output voltage of the motor 2 is limited, the current commands id*, iq* for realizing a certain rotational speed are non-existent.

Further, if the torque command T* becomes greater than the constant torque curve 63, the d-axis current and the q-axis current of the constant torque curve 63' become greater than those of the constant torque curve 63. At this point, the constant torque curve 63' and the constant voltage curve 62 intersect at an intersections A" and B", and the region surrounded by the constant voltage curve 62 and the constant torque curve 63' becomes narrow. When the torque command T* further increases, the constant torque curve 63' and the constant voltage curve 62 no longer intersect. In other words, when the output voltage of the motor 2 is limited, the current commands id*, iq* that satisfy the requested torque command T* are non-existent.

Therefore, in the present embodiment, the torque limit calculator 30 is configured to calculate a torque limit Tlim so that the current phase angle β is not at or does not exceed a current phase angle limit (current phase angle maximum value) βlim, and avoid the situation in which the current commands id*, iq* are non-existent. Specifically, the torque limit calculator 30 performs torque limitation using following Formula.

Ignoring the resistance component in the high speed range, the output voltage is expressed by the following formula.

$$V = \omega \sqrt{(L_d^2 \cos^2\beta + L_q^2 \sin^2\beta)}$$ [Mathematical 8]

On the other hand, the torque is expressed by the following formula.

$$T = p(L_d - L_q) I \cos\beta * I \sin\beta$$ [Mathematical 9]

Solving for the torque from these, the following formula is obtained.

[Mathematical 10]

$$T = p(L_d - L_q)\sin\beta\cos\beta \frac{V^2}{\omega^2(L_d^2\cos^2\beta + L_q^2\sin^2\beta)}$$

When the current phase angle β in this formula is the current phase angle limit βlim and the output voltage V is the voltage limit value Vlim, the following formula (7) is obtained.

[Mathematical 11]

$$T_{lim} = \pm p(L_d - L_q)\sin\beta_{lim}\cos\beta_{lim} \frac{V^2}{\omega^2(L_d^2\cos^2\beta_{lim} + L_q^2\sin^2\beta_{lim})}$$ Formula (7)

Here, p is the number of pole pairs of the motor 2, Ld is the d-axis inductance, Lq is the q-axis inductance, Vlim is the limit value of the output voltage of the inverter 1, and ω is the rotational speed of the motor 2.

Note that the torque limit calculator 30 may calculate the value of the q-axis inductance Lq used for the calculation of the following formula (1) by using, for example, a table storing a value of the q-axis inductance Lq in accordance with the q-axis current iq. Further, Vlim may be calculated by the Formula (A), or the value calculated by the weak magnetic flux controller 28 may be used. Also, the value of the current phase angle limit βlim is recorded in advance in a memory (not shown) and is used in the calculation by the torque limit calculator 30.

The torque limiter 31 is configured to receive the torque limit Tlim from the torque limit calculator 30 and suppress the torque command T* so that it does not exceed the torque limit Tlim. In other words, the torque limiter 31 compares the input torque T* against the torque limit Tlim, and if the torque command T* is greater than the torque limit Tlim, the torque limiter 31 outputs the torque command T2* as a value equal to the torque limit Tlim. If the torque command T* is at or below the torque limit Tlim, the torque limiter 31 outputs the torque command T2* as the torque command T* as a value equal to the torque command T*.

The adder 36 is disposed at a stage subsequent to the current phase angle calculator 33 and at a stage preceding the sign converter 34, and it is configured to add the current phase angle β0 at which the copper loss is minimum to the weak magnetic flux current phase angle βFW output from the weak magnetic flux controller 28, and then output the result.

The inverter control device and the motor drive system of the present embodiment are, except for the aforementioned configuration, the same as those of the above-described first embodiment and the effects achieved in the present embodiment are the same as those achieved in the above-described first embodiment.

Further, the current amplitude command calculator 32 can output the current amplitude I* in accordance with the torque command T2* regardless of the current phase angle β*. It can therefore output the torque according to the torque command T2*, even if the current phase angle β is changed by the weak magnetic flux current phase angle βFW output from the weak magnetic flux controller 28.

In addition, when the speed control is used, since the torque according to the torque command T2* can be output by the current phase angle calculator 32 by the current phase angle β*, the control for changing the current phase angle β* by the weak magnetic flux controller 28 interferes with the speed control, by which vibration and divergence of the control system can be prevented.

As described above, according to the present embodiment, it is possible to provide an inverter control device and a motor drive system that avoid interference between the speed control and the control for changing the current phase angle such as a control for minimizing copper loss, a control for maximizing efficiency, or a control for a weak magnetic flux.

Note that, even if β0 is a constant value instead of a value changed by the current phase angle calculator 33 according to the current, it is possible in the second embodiment to avoid interference between the speed control and the control for changing the current phase angle of the weak magnetic flux.

Moreover, as described above, by limiting the torque at the torque limiter 31 such that the current phase angle is not at or does not exceed βlim, and thus by the absence of a current command satisfying the requested torque command for a certain speed or direct current voltage limitation, it is possible to suppress a divergence of the control. When adding a limitation to the current phase angle, the weak magnetic flux control system does not operate properly, resulting in overvoltage, whereas, by adding a limitation to the current phase angle in accordance with the torque limitation, the speed can be decreased and stall can be prevented, similar to a general stall prevention operation.

In other words, according to the inverter control device and the motor drive system of the present embodiment, the current amplitude command can be generated so that the output torque of the motor is in accordance with the torque command.

While several embodiments of the present invention have been described, these embodiments have been presented by way of example and are not intended to limit the scope of the invention. These novel embodiments can be implemented in various other forms and various omissions, substitutions, and changes can be made without departing from the spirit of the invention. The embodiments and the modifications thereof are within the scope and gist of the invention and are within the invention described in the claims and the scope equivalent thereto.

For example, in the above-described first and second embodiments, the current phase angle calculator 33 is configured to calculate, from the current amplitude, the current phase angle β0 at which the copper loss is the minimum, but the present invention is not limited to this. The current phase angle calculator 33 may also be configured to calculate, instead of the current phase angle β0 at which the copper loss is the minimum, the current phase angle β0 at which the total loss, that is, the loss obtained by adding iron loss to the copper loss, is the minimum, and then output the result. In this case as well, effects similar to those achieved in the above-described first and second embodiments can be achieved.

Moreover, although in the above-described first and second embodiments, as the motor 2, the synchronous reluctance motor is adopted, the invention is not limited to this. Effects similar to those achieved in the above-described first and second embodiments can be achieved by adopting, as the motor 2, a permanent magnet synchronous motor having a small magnetic flux.

In the above first and second embodiments, the inverter control device may be configured from hardware or software, or by combining hardware and software. For example, the inverter control device may comprise one or a plurality of processors and a memory, and the calculations to be executed in each of the configurations may be realized by software. In either case, the same effects as in the above first and second embodiments can be achieved.

The invention claimed is:

1. An inverter control device comprising:
an inverter main circuit;
a current detector for detecting a current response output from the inverter main circuit;
a vector converter for converting the current response into a d-axis current and a q-axis current by using a rotational phase angle of a motor connected to the inverter main circuit;
a current amplitude command calculator for calculating, based on a torque command and a current phase angle command, a current amplitude command of the current response output from the inverter main circuit;
a dq-axes converter for calculating a d-axis current command and a q-axis current command from the current amplitude command and the current phase angle command; and
a current controller for calculating a voltage command so that the d-axis current command and the q-axis current command are equal to the d-axis current and the q-axis current.

2. The inverter control device according to claim 1, further comprising a speed controller for calculating a torque command of the motor so that a rotational speed of the motor equals a rotational speed command supplied from the outside.

3. The inverter control device according to claim 2, further comprising a current phase angle command value calculator for calculating the current phase angle command such that the voltage command does not exceed a maximum output voltage value.

4. A motor drive system comprising:
the inverter control device according to claim 2; and
the motor connected to the inverter main circuit.

5. The motor drive system according to claim 4, wherein the motor is a synchronous reluctance motor.

6. The inverter control device according to claim 1, further comprising a current phase angle command calculator for calculating, based on the current amplitude command, the current phase angle command of the current response output from the inverter main circuit.

7. The inverter control device according to claim 6, further comprising:
a torque limit calculator for calculating a maximum torque command value that does not exceed a current phase angle maximum value; and
a torque limiter for limiting so that the torque command does not exceed the maximum torque command value.

8. A motor drive system comprising:
the inverter control device according to claim 6; and
the motor connected to the inverter main circuit.

9. The motor drive system according to claim 8, wherein the motor is a synchronous reluctance motor.

10. The inverter control device according to claim 1, further comprising a current phase angle command value calculator for calculating the current phase angle command such that the voltage command does not exceed a maximum output voltage value.

11. The inverter control device according to claim 10, further comprising:
 - a torque limit calculator for calculating a maximum torque command value that does not exceed a current phase angle maximum value; and
 - a torque limiter for limiting so that the torque command does not exceed the maximum torque command value.

12. A motor drive system comprising:
 the inverter control device according to claim 10; and
 the motor connected to the inverter main circuit.

13. The motor drive system according to claim 12, wherein the motor is a synchronous reluctance motor.

14. The inverter control device according to claim 1, further comprising:
 - a first current phase angle command calculator for calculating a first current phase angle command from the current amplitude command;
 - a second current phase angle command calculator for calculating a second current phase angle command so that the voltage command does not exceed a targeted output voltage value; and
 - an adder for calculating the current phase angle command by adding the first current phase angle command and the second current phase angle command.

15. A motor drive system comprising:
 the inverter control device according to claim 14; and
 the motor connected to the inverter main circuit.

16. The motor drive system according to claim 15, wherein the motor is a synchronous reluctance motor.

17. A motor drive system comprising:
 the inverter control device according to claim 1; and
 the motor connected to the inverter main circuit.

18. The motor drive system according to claim 17, wherein the motor is a synchronous reluctance motor.

\* \* \* \* \*